April 12, 1932.  R. W. CHALMERS  1,853,605

CHAIN ANCHOR

Filed June 13, 1931  3 Sheets-Sheet 1

Inventor
Raymond W. Chalmers
by
T. R. Bryant
Attorney.

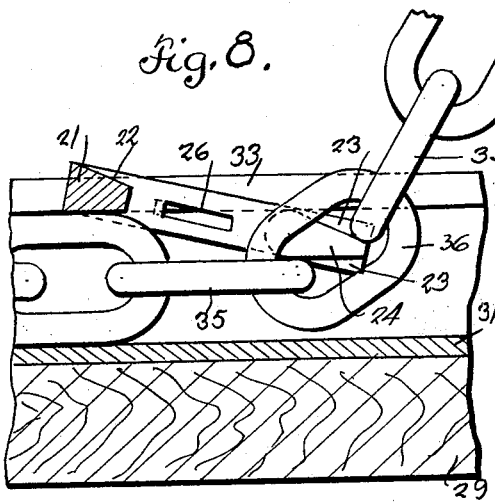
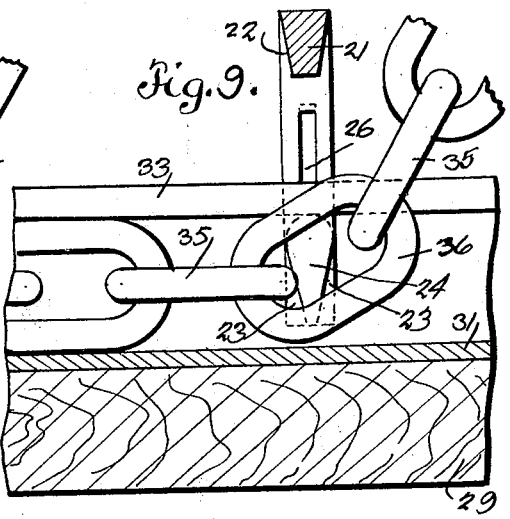
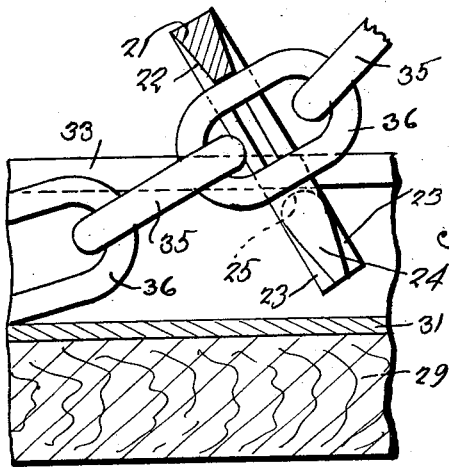
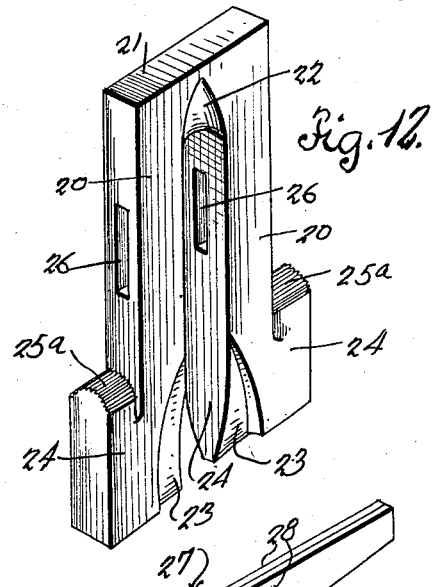
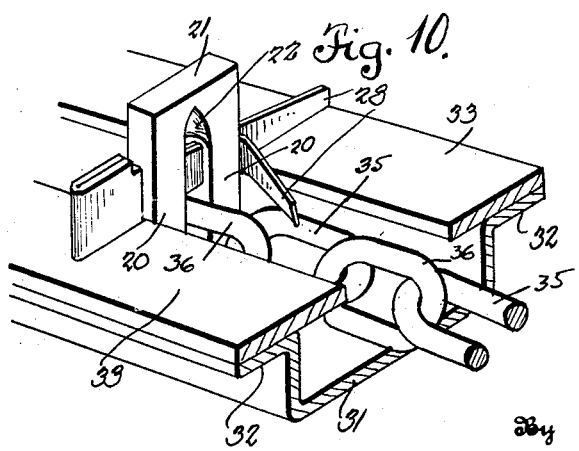

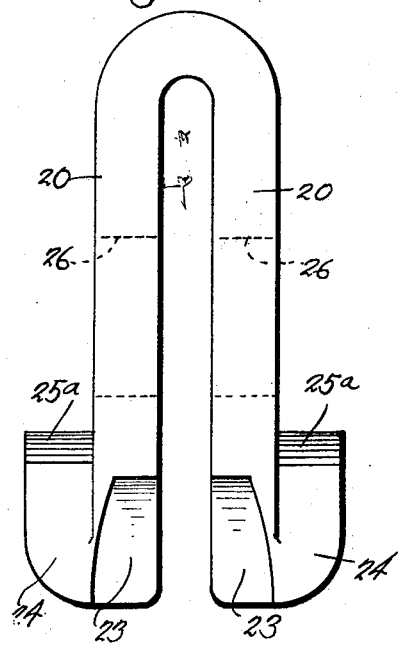
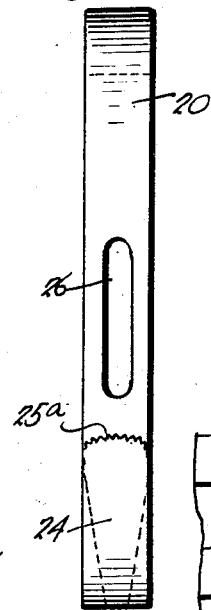
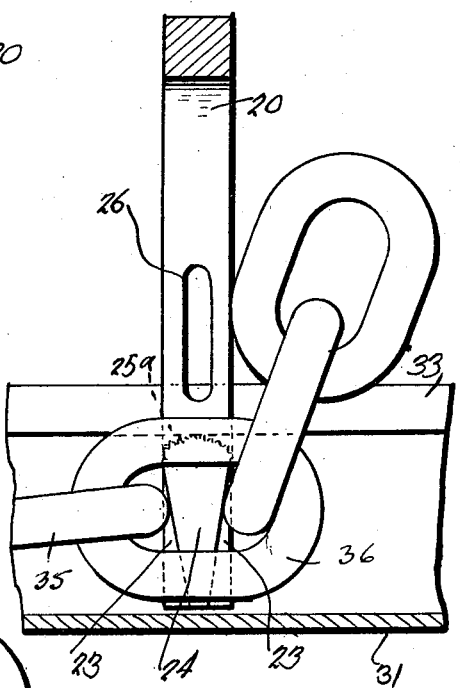
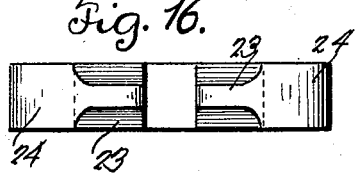
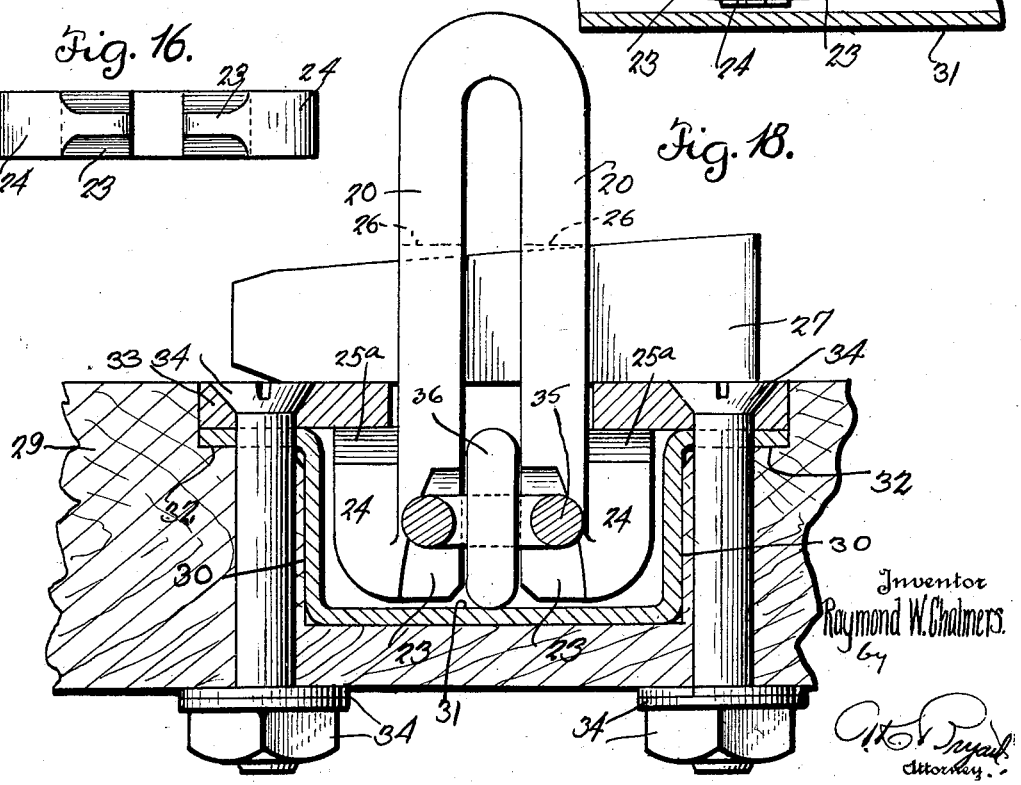

Patented Apr. 12, 1932

1,853,605

UNITED STATES PATENT OFFICE

RAYMOND W. CHALMERS, OF DETROIT, MICHIGAN, ASSIGNOR TO EVANS PRODUCTS COMPANY, OF DETROIT, MICHIGAN, A CORPORATION OF DELAWARE

CHAIN ANCHOR

Application filed June 13, 1931. Serial No. 544,270.

This invention relates to certain new and useful improvements in chain anchors.

The primary object of the invention is to provide a chain anchor wherein a linked chain movable through a channel member has an anchor device or dog associated therewith and cooperating with the channel member to permit movement of the chain and anchor member through the channel, movement of the chain independently of the anchor member with the anchor member lockingly engaged with the channel and cooperating with the chain to prevent movement of the latter.

Another object of the invention is to provide a chain anchor especially serviceable in the anchoring or suspension of a motor vehicle upon the floor, wall or roof of a freight car or other support, the chain being shiftable through a channel guide and securely anchored at a desired point.

With the above and other objects in view that will become apparent as the nature of the invention is better understood, the same consists in the novel form, combination and arrangement of parts hereinafter more fully described, shown in the accompanying drawings and claimed.

In the drawings:—

Figure 8 is a detail longitudinal sectional view showing the dog partially lowered to permit movement of the chain relative to the channel member and independently of the dog;

Figure 9 is a detail longitudinal sectional view showing the dog in raised position to receive the locking key;

Figure 10 is a fragmentary perspective view, partly in section showing the locking key engaged with the dog and upper wall of the channel member above a perpendicular link;

Figure 11 is a detail longitudinal sectional view showing the locking dog in position to receive the key between the sides of a perpendicular link above the channel member;

Figure 12 is a perspective view of the locking dog;

Figure 13 is a perspective view of the locking key;

Figure 14 is a front elevational view of another form of anchor dog;

Figure 15 is an edge elevational view of the anchor dog;

Figure 16 is a bottom edge elevational view;

Figure 17 is a detail longitudinal sectional view with the locking dog in position to receive the key; and Figure 18 is a cross-sectional view of the channel member shown in Figure 17 with the dog and link chain anchored in position.

Figure 1:
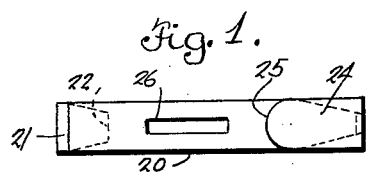
Figure 1 is an edge elevational view of the anchor device or dog associated with the channel member and link chain.
Figure 6:
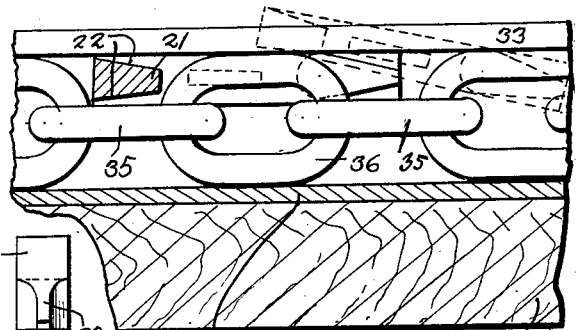
Figure 6 is a detail longitudinal sectional view showing the anchor dog lowered into position within the channel member with the cross head of the dog positioned for engagement by an adjacent perpendicular link and movable with the link chain, the dog being partially elevated as illustrated by dotted lines, permitting movement of the chain independently of the dog.
Figure 2:
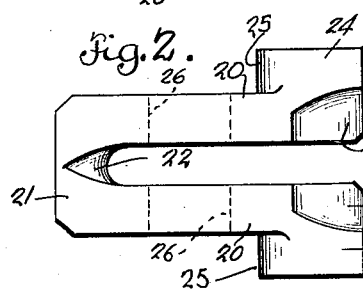
Figure 2 is a front elevational view of the dog showing the side legs and the outwardly directed clamping shoulder on each leg.
Figure 3:
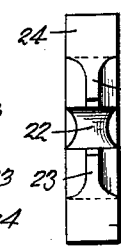
Figure 3 is a bottom edge elevational view of the dog.

Referring more in detail to the accompanying drawings and particularly to Figures 1 to 13, there is illustrated a chain anchor wherein a link chain having a part thereof extending through a channel member has a dog associated therewith and also with said channel member for anchoring the chain against movement, the dog as illustrated in Figures 1 to 3 comprising a pair of side legs 20 connected at one end by a cross head 21 forming a dog of substantially U-shape, opposite sides of the crotch being outwardly beveled as at 22, the spaced disconnected ends of the side legs 20 each have a depression 23 formed therein on the inner edge thereof and each leg at the outer side of the spaced ends carries an outwardly directed block portion 24 that has its upper end rounded as at 25 to provide an abutment shoulder for purposes presently to appear. The spaced side legs 20 are provided with registering key receiving slots 26 for the passage of a wedge key, such as shown in Figures 4, 5, 10 and 13.

The wedge key 27 may be formed of sheet metal as indicated in Figure 13 with the sides 28 thereof folded into contact for passage through the leg slots 26.

A structure 29 of any character such as the floor, wall or roof of a freight car is longitudinally grooved as at 30 to provide a recess or seat for a channel member 31 U-shaped in cross-section with outwardly directed upper edge flanges 32 providing supports for a top plate 33, adjacent edges of which are spaced from each other and secured in position, together with the channel member by the fastening devices 34. A chain comprising horizontally and perpendicularly disposed links 35 and 36 respectively is located within the channel member 31 and the adjacent edges of the plate 33 are spaced a distance apart to permit removal of the horizontally disposed links 35 from the channel member.

Figure 4:
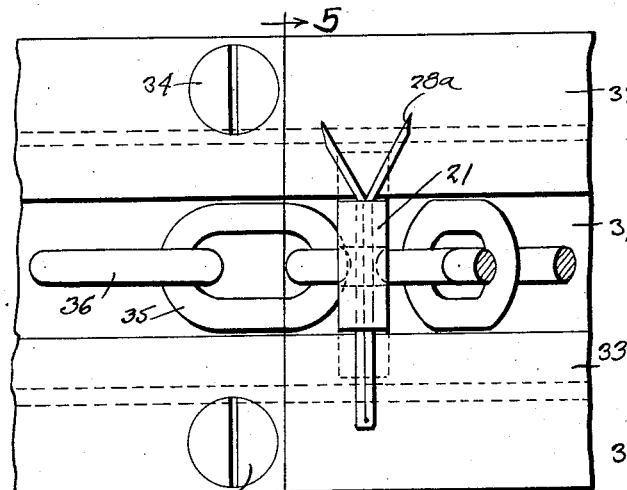
Figure 4 is a fragmentary top plan view of a channel member with a link chain positioned in the channel member and anchored against movement by the anchor dog.
Figure 7:
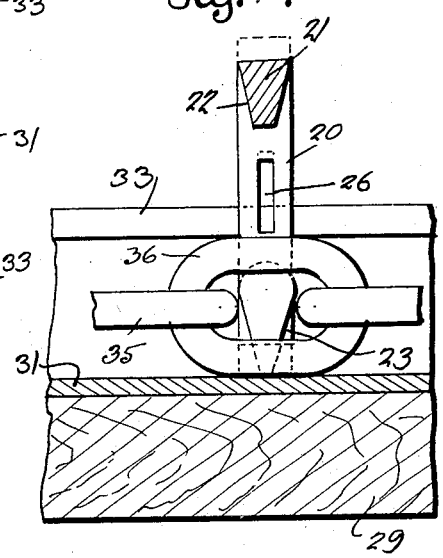
Figure 7 is a detail longitudinal sectional view with the dog shown in section with the locking key for the dog removed to permit lowering movement of the dog relative to the channel member.
Figure 5:
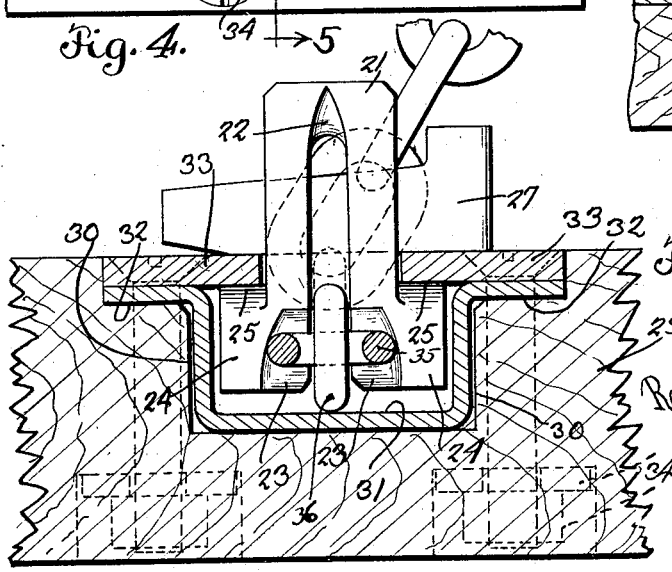
Figure 5 is a cross-sectional view taken on line 5—5 of Figure 4, showing the wedge key engaged with the dog above the channel member for anchoring the dog in position with a horizontally disposed link abutting the lower end of the dog within the channel member.

In the assembly of the parts, the dog is positioned in the channel member with its major transverse axis extending transversely of the longitudinal axis of the channel member with the block shoulders 25 disposed beneath the edges of the plates 33 overhanging the channel member with the dog position as illustrated in Figure 5, a perpendicular link 36 extends between the legs of the dog and one end of a horizontal link 35 is engaged in the depressions 23 in the lower ends of the legs of the dog. The key 27 is passed through the aligned slots 26 in the legs of the dog above the channel plates 33 and said key being of wedge-shape as illustrated in Figure 13, the block shoulders 25 of the dog are moved into binding engagement with the undersides of the overhanging edges of the channel plates 33, the chain being thus locked against movement relative to the channel member. The ends 28a of the key may be distorted or separated as illustrated in Figure 4 to retain the key in position in the dog. When it is desired to shift the chain relative to the channel member, the key 27 is removed from the dog slots 26 and the dog will assume the position shown in Figure 7, dropping toward the bottom of the channel member and to be shifted to either side according to the direction that it is desired to move the chain. When the dog is moved to the full line position illustrated in Figure 6, the cross-head 21 thereof lies adjacent a horizontal link 35 and in position to be engaged by one end of a perpendicular link 36, the lower end of the dog being confined in the channel member and a pull upon the chain will cause movement thereof together with the dog through the channel member. When it is desired to shift the chain and allow the dog to remain immovable relative to the channel member, the dog assumes the dotted line position shown in Figure 6 and the full line position shown in Figure 8, the cross head 21 thereof being slightly elevated to permit the upper side of a perpendicular link 36 to slide through the groove 22 in the crotch portion of the link, while the horizontally disposed links 35 move through the channel member in a path below the lower end of the dog legs. To anchor the dog in position as illustrated in Figure 4, the dog is first located as illustrated in Figure 9 and the key 27 inserted in the adjacent slots of the dog above the channel plates 33. It is also possible to dispose the dog at an angle relative to the channel member when in locked postion and to insert the wedge key 27 through a perpendicular link 36 as illustrated in Figure 11, the dog being disposed as illustrated with the wedge key inserted between the sides of the perpendicular link and passed through the slots in the side legs 20 of the dog and in each instance, the block shoulders 25 are engaged with the undersides of the overhanging edges of the channel plates 33. When a double lock or anchor for the chain is desired, two dogs may be employed, both of which may assume positions shown in either Figures 9 or 11 or one dog may be perpendicularly disposed and the other dog disposed at an angle.

The dog illustrated in Figure 12 is similar to the dog illustrated in Figures 1 to 3 except that the shoulders are corrugated or serrated as at 25a to provide a more positive gripping engagement with the channel plates 33 for a more rigid anchoring of the dog and chain.

In the form of invention illustrated in Figures 14 to 18, the dog is of a more simplified construction and is capable of use with a heavier type of link chain, the structural features thereof being similar to the form of dog illustrated in Figure 12 with parts designated by like reference characters, this construction of dog being preferably formed from rod or bar material bent into U-shape to provide the side legs.

From the above detailed description of the invention, it is believed that the construction and operation thereof will at once be apparent, it being noted that the chain anchor may be used in any art desired wherever applicable and while the channel member has been described in detail, it is to be understood, that other forms of channel members may be employed and while there are herein shown and described the preferred embodiments of the present invention, it is nevertheless to be understood that minor changes may be made therein without departing from the spirit and scope of the invention as claimed.

I claim:—

1. In a chain anchor of the character described, the combination with a channel member having a link-chain movable therethrough, of an anchor dog for the chain positioned in the channel member and clampingly engaged with the channel member and lockingly engaged with the chain for holding the latter against movement.

2. In a chain anchor of the character described, the combination with a channel member having a link-chain movable therethrough, of an anchor dog for the chain slidably positioned in the channel member and adapted to be lockingly engaged with the channel member and chain for holding the latter against movement, said dog being of inverted U-shape and when in inclined position with one end above the channel member permitting movement of the perpendicular link of the chain between the legs thereof and movement of the horizontal links beneath the same.

3. In a chain anchor of the character described, the combination with a channel member having a link-chain movable therethrough, of an anchor dog for the chain positioned in the channel member and lockingly engaged with the channel member and chain for holding the latter against movement, said dog being movable in the channel member with one end thereof positioned for engagement by a link to be movable through the channel member with the chain.

4. In a chain anchor of the character described, the combination with a channel member having a link-chain movable therethrough, of an anchor dog for the chain positioned in the channel member and lockingly engaged with the channel member and chain for holding the latter against movement, said dog being movable in the channel member with one end thereof positioned for engagement by a link to be movable through the channel member with the chain, said dog being of inverted U-shape and when in inclined position with one end above the channel member permitting movement of the perpendicular links of the chain between the legs thereof and movement of the horizontal links beneath the same.

5. A locking dog for anchoring chains comprising a pair of side legs, a cross head connecting one end of each of the legs and lateral locking shoulders at the other ends at the outer sides of the legs.

6. In a chain anchor of the character described, the combination with a channel member having a link-chain movable therethrough, of an anchor dog for the chain positioned in the channel member and clampingly engaged with the channel member and lockingly engaged with the chain for holding the latter against movement, the anchor dog including side legs between which the perpendicular links of the chain pass and the dog being positioned for engagement at the lower ends of the legs by a horizontal link.

7. In a chain anchor of the character described, the combination with a channel member having a link-chain movable therethrough, of an anchor dog for the chain slidably positioned in the channel member and adapted to be lockingly engaged with the channel member and chain for holding the latter against movement, said dog when in inclined position with one end above the channel member permitting movement of the chain relative to the dog, the anchor dog including side legs between which the perpendicular links of the chain pass and the dog being positioned for engagement at the lower ends of the legs by a horizontal link.

8. In a chain anchor of the character described, the combination with a channel member having a link-chain movable therethrough, of an anchor dog for the chain positioned in the channel member and lockingly engaged with the channel member and chain for holding the latter against movement, said dog being movable into the channel member with one end thereof position for engagement by a link to be movable through the channel member with the chain, the anchor dog including side legs between which the perpendicular links of the chain pass and the dog being positioned for engagement at the lower ends of the legs by a horizontal link.

9. In a chain anchor of the character described, the combination with a channel member having a link-chain movable therethrough, of an anchor dog for the chain positioned in the channel member and lockingly engaged with the channel member and chain for holding the latter against movement, the anchor dog including side legs between which the perpendicular links of the chain pass and the dog being positioned for engagement at the lower ends of the legs by a horizontal link, lateral shoulders on the lower ends of the legs for engagement with walls of the channel member, and a locking key engaged with the dog and channel member for moving the dog shoulders into engagement with walls of the channel member.

10. In a chain anchor of the character described, the combination with a channel member having a link-chain movable therethrough, of an anchor dog for the chain positioned in the channel member and lockingly engaged with the channel member and chain for holding the latter against movement, said dog when in inclined position with one end above the channel member permitting movement of the chain relative to the dog, the anchor dog including side legs between which the perpendicular links of the chain pass and the dog being positioned for engagement at the lower ends of the legs by a horizontal link, lateral shoulders on the lower ends of the legs for engagement with walls of the channel member, and a locking key engaged with the dog and channel member for moving the dog shoulders into engagement with walls of the channel member.

11. In a chain anchor of the character described, the combination with a channel member having a link-chain movable therethrough, of an anchor dog for the chain positioned in the channel member and lockingly engaged with the channel member and chain for holding the latter against movement, said dog being movable into the channel member with one end thereof positioned for engagement by a link to be movable with the chain, the anchor dog including side legs between which the perpendicular links of the chain pass and the dog being positioned for engagement at the lower ends of the legs by a horizontal link, lateral shoulders on the lower ends of the legs for engagement with walls of the channel member, and a locking key engaged with the dog and channel member for moving the dog shoulders into engagement with walls of the channel member.

12. In a chain anchor of the character described, the combination with a channel member having a link-chain movable therethrough, of an anchor dog for the chain positioned in the channel member and lockingly engaged with the channel member and chain for holding the latter against movement, the anchor dog including side legs between which the perpendicular links of the chain pass and the dog being positioned for engagement at the lower ends of the legs by a horizontal link, lateral shoulders on the lower ends of the legs for engagement with walls of the channel member, there being slotted openings in the upper ends of the legs and a wedge locking key insertible in the leg openings and engaged with the channel member for moving the dog shoulders into engagement with walls of the channel member.

13. In a chain anchor of the character described, the combination with a channel member having a link-chain movable therethrough, of an anchor dog for the chain positioned in the channel member and lockingly engaged with the channel member and chain for holding the latter against movement, said dog when in inclined position with one end above the channel member permitting movement of the chain relative to the dog, the anchor dog including side legs between which the perpendicular links of the chain pass and the dog being positioned for engagement at the lower ends of the legs by a horizontal link, lateral shoulders on the lower ends of the legs for engagement with walls of the channel member, there being slotted openings in the upper ends of the legs and a wedge locking key insertible in the leg openings and engaged with the channel member for moving the dog shoulders into engagement with walls of the channel member.

14. In a chain anchor of the character described, the combination with a channel member having a link-chain movable therethrough, of an anchor dog for the chain positioned in the channel member and lockingly engaged with the channel member and chain for holding the latter against movement, said dog being movable into the channel member with one end thereof positioned for engagement by a link to be movable with the chain, the anchor dog including side legs between which the perpendicular links of the chain pass and the dog being positioned for engagement at the lower ends of the legs by a horizontal link, lateral shoulders on the lower ends of the legs for engagement with walls of the channel member, there being slotted openings in the upper ends of the legs and a wedge locking key insertible in the leg openings and engaged with the channel member for moving the dog shoulders into engagement with walls of the channel member.

15. In a chain anchor of the character described, the combination with a channel member having a link-chain movable therethrough, of an anchor dog for the chain positioned in the channel member and lockingly engaged with the channel member and chain for holding the latter against movement, said dog being movable into the channel member with one end thereof positioned for engagement by a link to be movable with the chain, the anchor dog including side legs between which the perpendicular links of the chain pass and the dog being positioned for engagement at the lower ends of the legs by a horizontal link, lateral shoulders on the lower ends of the legs for engagement with walls of the channel member, there being slotted openings in the upper ends of the legs and a wedge locking key insertible in the leg openings and engaged with the channel member for moving the dog shoulders into engagement with walls of the channel member, and said shoulders being serrated to increase binding engagement between the shoulders and channel member walls.

16. The combination with a channel member having a linked chain lying therein with adjacent links respectively horizontally and perpendicularly disposed and freely movable upwardly through the channel member, of an anchor dog of inverted U-shape having the spaced ends of its legs disposed in the channel member and straddling the perpendicular links, a side shoulder on each leg for engagement with a wall of the channel member and means for moving the leg shoulders into binding engagement with the channel member for anchoring the chain against movement.

17. The combination with a channel member having a linked chain lying therein with adjacent links respectively horizontally and perpendicularly disposed and freely movable upwardly through the channel member, of an anchor dog of inverted U-shape having the spaced ends of its legs disposed in the channel member and straddling the perpendicular links, a side shoulder on each leg for engagement with a wall of the channel member and means for moving the leg shoulders into binding engagement with the channel member for anchoring the chain against movement, and said dog being partially movable into the channel member whereby the chain may be moved independently of the dog, and completely movable into the channel member for interlocking engagement with the chain to be movable with the latter.

In testimony whereof I affix my signature.

RAYMOND W. CHALMERS.